(12) United States Patent
Diorio et al.

(10) Patent No.: US 9,213,870 B1
(45) Date of Patent: *Dec. 15, 2015

(54) RFID TAG AND READER AUTHENTICATION BY TRUSTED AUTHORITY

(71) Applicant: Impinj, Inc., Seattle, WA (US)

(72) Inventors: Christopher J. Diorio, Shoreline, WA (US); Scott A. Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,401

(22) Filed: Jul. 25, 2014

Related U.S. Application Data

(63) Continuation of application No. 13/396,889, filed on Feb. 15, 2012, now Pat. No. 8,866,594.

(51) Int. Cl.
*G06K 7/10* (2006.01)
*H04L 9/08* (2006.01)

(52) U.S. Cl.
CPC .......... *G06K 7/10009* (2013.01); *H04L 9/0816* (2013.01); *H04L 2209/24* (2013.01)

(58) Field of Classification Search
CPC ............. G06K 7/10009; H04L 9/0816; H04L 2209/24
See application file for complete search history.

*Primary Examiner* — Kristy A Haupt
(74) *Attorney, Agent, or Firm* — Turk IP Law, LLC

(57) ABSTRACT

A Radio Frequency Identification (RFID) reader containing a reader key authenticates an RFID tag containing a tag key by receiving a reader challenge from a verification authority; determining a reader response based at least on the reader challenge and the reader key; sending a first message including at least the reader response but not the reader key to the verification authority; receiving a tag identifier from the tag; challenging the tag with a tag challenge; receiving a tag response based at least on the tag challenge and the tag key but not including the tag key; sending a second message including at least the tag identifier and the tag response to the verification authority; and receiving an electronically-signed reply from the verification authority. The reader validates the verification authority reply by checking the signature. The verification authority may notify a designated party if a response is incorrect.

20 Claims, 13 Drawing Sheets

RFID READER SYSTEM CONFIGURATION WITH
OPTIONAL LOCAL AND REMOTE COMPONENTS

ARCHITECTURE OF INTERFACE CONVERTER
WITH AGENT AND UTILITY

SAMPLE SCREENSHOT OF INTERFACE
CONVERTER EXPOSING TO AGENT OPTIONS TO
CONTROL FUNCTIONALITY OF TAG
AUTHENTICATION UTILITY

RFID TAG AND READER AUTHENTICATION BY TRUSTED AUTHORITY

RELATED APPLICATIONS

This application is a continuation of U.S. patent application Ser. No. 13/396,889 filed on Feb. 15, 2012 by the same inventors, commonly assigned herewith.

CROSS REFERENCE TO RELATED APPLICATIONS

This application claims the benefit of U.S. Provisional Patent Application Ser. Nos. 61/443,842 filed on Feb. 17, 2011 and 61/480,543 filed on Apr. 29, 2011. The disclosures of the provisional patent applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In practice, an RFID reader interrogates one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device such as a battery, and are called passive tags. Of course, even passive tags typically include temporary energy- and data/flag-storage elements such as capacitors or inductors.

Counterfeiting is a problem in many areas of global commerce. Many RFID-enabled applications need to verify the authenticity of the RFID tags, readers, and system components used in the application. For example, a retailer receiving a shipment of tagged items often needs to determine whether the tags, and by implication the items to which the tags are attached, are genuine or counterfeit.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments are directed to RFID tag authentication. An RFID reader authenticates an RFID tag containing a key by challenging the tag with a challenge. The reader receives one or more responses from the tag including an identifier and an answer to the challenge and sends a message including the received identifier, the challenge, and the answer to a verification authority. The verification authority checks the authenticity of the tag's responses and transmits a reply to the reader. The reply includes an electronic signature from the verification authority. The reader validates the verification authority's reply by checking the electronic signature. In some embodiments the verification authority also (or instead) transmits a notification including an electronic signature to a designated party if the tag's responses are incorrect.

Some embodiments are directed to RFID reader authentication. In these embodiments, the RFID reader contains a reader key, and receives a reader challenge from a verification authority. The reader determines a reader response based at least on the reader challenge and the reader key and transmits the reader response to the verification authority. The verification authority then verifies the authenticity of the reader and optionally notifies the reader and/or a designated party.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
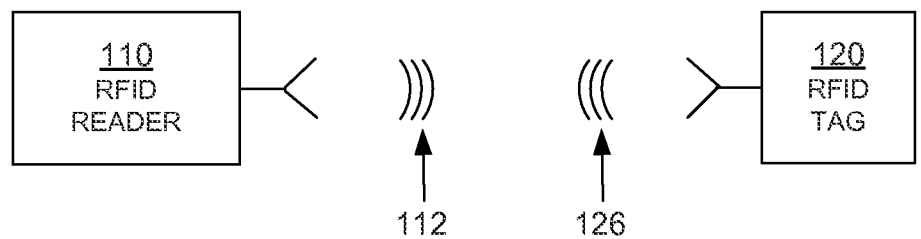
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In some applications, RFID systems are called upon to ensure the authenticity of an item to which a tag is attached. The RFID tag may include an identifier (ID) such as but not limited to a tag identifier (TID), key identifier (KID), unique item identifier (UII), electronic product code (EPC), or a serialized trade identification number (SGTIN). In typical applications each individual RFID tag or group of tags also will contain a secret or key, which is typically not readable by an RFID reader but is known to a verification authority. The verification authority can determine which key a particular tag employs by using the ID as a table lookup or input to an algorithmic key generator.

To authenticate a tag, the reader interrogates the tag to determine the tag's ID, challenges the tag with a random number or string, receives a response from the tag, and then sends the ID, challenge, and response to the verification authority. In some applications each individual RFID tag or group of tags will contain a distinct key, and the verification authority can determine which key a particular tag employs by using the ID as a table lookup or input to an algorithmic key generator. The tag computes its response from at least the challenge and the key, typically using a cryptographic algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its ID and response for the verification authority to determine the tag-generated randomness algorithmically. In some applications, to further enhance security, the tag may encrypt its tag-generated randomness in an Initial Value (IV) and send the IV to the reader for relaying to the verification authority. In yet other applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

To truly authenticate a tag, the reader or designated party needs to know that the verification authority's reply or notification is genuine and has not been forged or altered. Said another way, the entity receiving the reply or notification needs to be able to verify that the reply or notification is from a trusted verification authority and was not forged by an illegitimate verification authority or altered during transmission.

In some applications the verification authority may have a need to authenticate the reader that is itself attempting to authenticate a tag. For an example why, suppose the converse, that the verification authority accepted tag-authentication requests from any reader. A counterfeiter could then manufacture counterfeit tags and, prior to releasing the tags into the field, test them by configuring an illegitimate reader to send a counterfeit tag ID, challenge and response to the verification authority and thereby ascertain whether the verification authority accepts the counterfeit tags. To prevent counterfeiters from this and other potential abuses, the verification authority may choose to require that the reader authenticate itself prior to responding.

Accordingly, embodiments are directed to authenticating RFID tags, RFID readers, and responses from a verification authority. An RFID tag or reader includes a secret, also known as a key, which is known to the verification authority. An RFID reader authenticates an RFID tag by sending a tag identifier, a tag challenge, and a tag response to the tag challenge (computed by the tag based on its secret) to the verification authority for confirmation or refutation. Similarly, the RFID reader authenticates itself by sending its identifier and a reader challenge-response (computed by the reader based on its secret and a received reader challenge) to the verification authority for confirmation or refutation. The reader authentication may occur before or simultaneously with a tag authentication. When the verification authority responds, to authenticate the tag, the reader, or to notify a designated party, it electronically signs its response so that the receiving entity can validate the signed response and therefore confirm that it did originate from the verification authority and is unaltered.

FIG. 1 is a diagram of components of a typical RFID system 100, incorporating embodiments. An RFID reader 110 transmits an interrogating radio frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms.

The RF waveforms are typically in a suitable range of frequencies, such as those near 900 MHz, 2.4 GHz, and so on.

Data exchange can be performed in a number of ways. Protocols are devised for readers and tags to exchange symbols, also called RFID symbols. A symbol for communicating can be a delimiter, a calibration symbol, and so on. Symbols can encode binary data, such as "0" and "1", if desired. When symbols are processed internally by reader 110 and tag 120 they can be considered and treated as numbers having corresponding values, and so on.

RFID tag 120 can be a passive, battery-assisted, or active tag. If RFID tag 120 is a passive tag, it is powered from wave 112.

Figure 2:
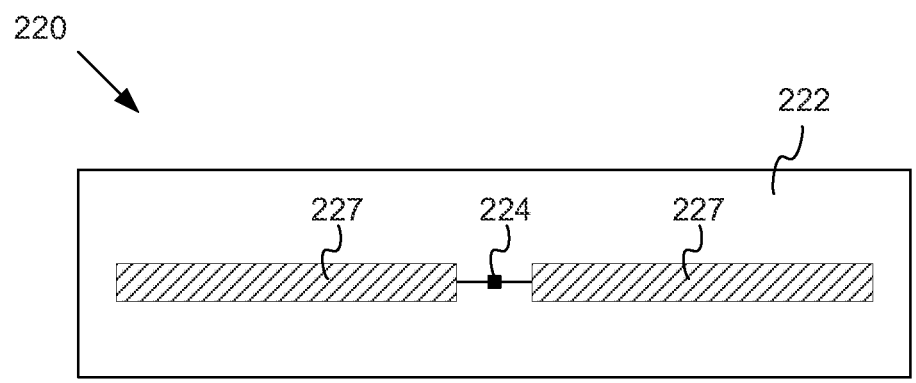
FIG. 2 is a diagram showing components of a passive RFID tag, such as a tag that can be used in the system of FIG. 1.

FIG. 2 is a diagram of an RFID tag 220, which can be the same as RFID tag 120 of FIG. 1. RFID tag 220 is shown as a passive tag. Regardless, much of what is described in this document also applies to semi-active and active tags.

RFID tag 220 is formed on a substantially planar inlay 222, which can be made in many ways known in the art. RFID tag 220 includes an electrical circuit 224 which is preferably implemented as an integrated circuit (IC). IC 224 is arranged on inlay 222.

RFID tag 220 also includes an antenna for exchanging wireless signals with the environment. The antenna is often flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments the antenna can comprise a single segment, and different points of the single segment can be coupled to one or more of the antenna terminals of IC 224. For example, the antenna can be a loop, with its ends coupled to the IC terminals. It should be remembered that even a single antenna segment can behave like multiple segments at the frequencies of RFID wireless communication.

In operation, a signal is received by the antenna and communicated to IC 224. IC 224 both harvests power, and responds if appropriate, based on the incoming signal and the IC's internal state. IC 224 may respond by modulating the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments the antenna segments may be formed on IC 224. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
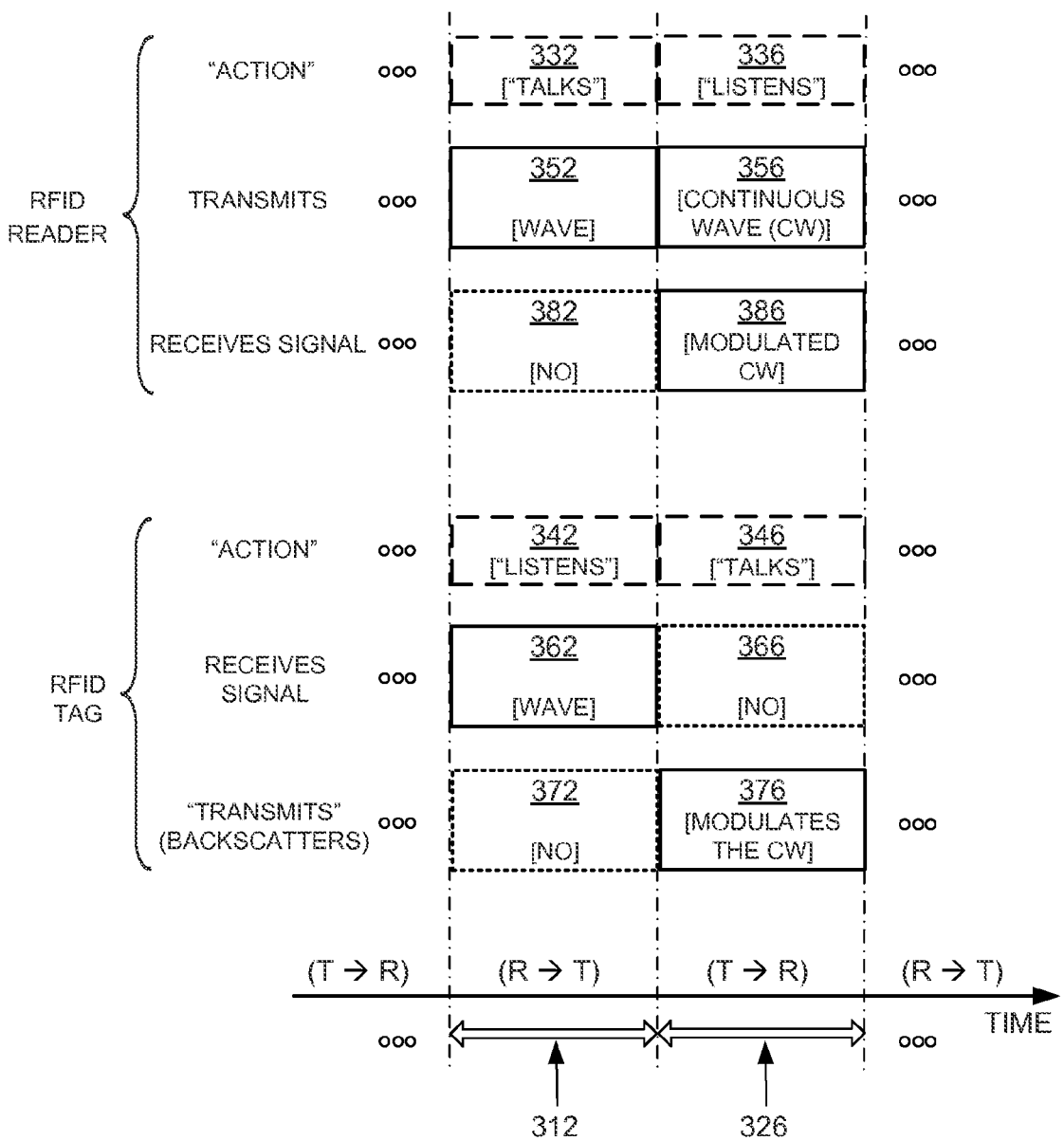
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when RFID reader 110 talks to RFID tag 120 the communication session is designated as "R→T", and when RFID tag 120 talks to RFID reader 110 the communication session is designated as "T→R". Along the TIME axis, a sample R→T communication session occurs during a time interval 312, and a following sample T→R communication session occurs during a time interval 326. Of course interval 312 is typically of a different donation than interval 326—here the durations are shown approximately equal only for purposes of illustration.

According to blocks 332 and 336, RFID reader 110 talks during interval 312, and listens during interval 326. According to blocks 342 and 346, RFID tag 120 listens while RFID reader 110 talks (during interval 312), and talks while RFID reader 110 listens (during interval 326).

In terms of actual technical behavior, during interval 312, RFID reader 110 talks to RFID tag 120 as follows. According to block 352, RFID reader 110 transmits wave 112, which was first described in FIG. 1. At the same time, according to block 362, RFID tag 120 receives wave 112 and processes it, to extract data and so on. Meanwhile, according to block 372, RFID tag 120 does not backscatter with its antenna, and according to block 382, RFID reader 110 has no wave to receive from RFID tag 120.

During interval 326, RFID tag 120 talks to RFID reader 110 as follows. According to block 356, RFID reader 110 transmits a Continuous Wave (CW), which can be thought of as a carrier signal that ideally encodes no information. As discussed before, this carrier signal serves both to be harvested by RFID tag 120 for its own internal power needs, and also as a wave that RFID tag 120 can backscatter. Indeed, during interval 326, according to block 366, RFID tag 120 does not receive a signal for processing. Instead, according to block 376, RFID tag 120 modulates the CW emitted according to block 356, so as to generate backscatter wave 126. Concurrently, according to block 386, RFID reader 110 receives backscatter wave 126 and processes it.

An order, a timing, and other parameters of RFID tag/reader communications may be defined by industry and/or government protocols (also known as standards). For example, the Class-1 Generation-2 UHF RFID Protocol for Communications at 860 MHz-960 MHz ("Gen2 Specification") by EPCglobal, Inc. is one such industry standard. The contents of the Gen2 Specification version 1.2.0 are hereby incorporated by reference.

Figure 4:
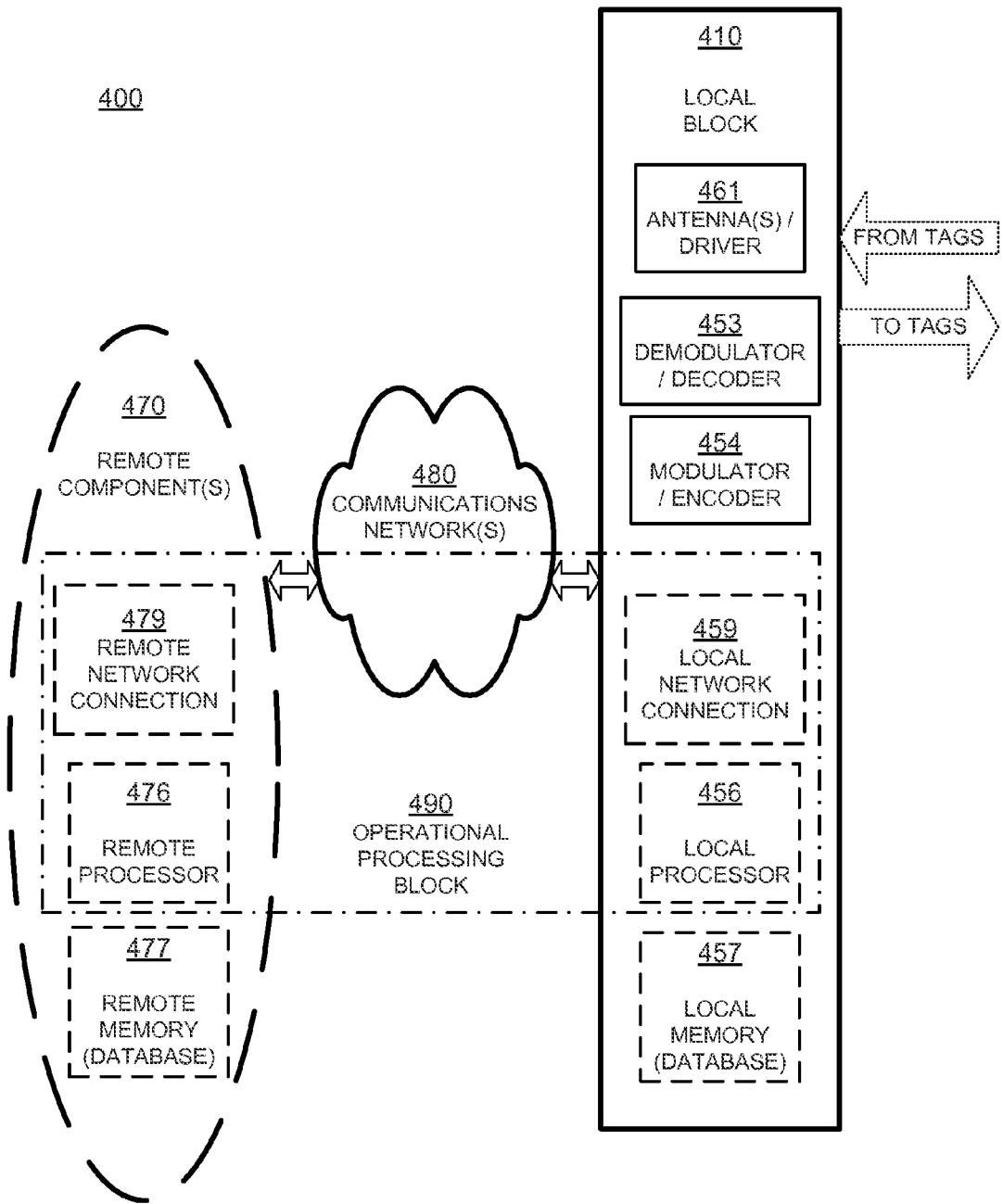
FIG. 4 is a block diagram showing a detail of an RFID reader, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and its driver. Some readers, like that shown in local block 410, contain a single antenna and driver. Some readers contain multiple antennas and/or drivers and a method to switch signals among them, including sometimes using different antennas for transmitting and for receiving. Some readers contain multiple antennas and drivers that operate simultaneously. A demodulator/decoder block 453 demodulates and decodes waves received from the tags via antenna/driver block 451. Modulator/encoder block 454 encodes and modulates an RF wave to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in an IC with local processor 456, with or without other components. Local memory 457, if provided, can store programs for local processor 456 to run.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC or TID codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected. Communications on the network can also, or additionally, be signed using an electronic signature, to ensure the integrity of the sender and the network.

There can be one or more remote component(s) 470. If more than one, they can be located at the same location or in different locations. They can communicate with each other and with local block 410 via communications network 480, or via other similar networks, using remote network connection(s) 479. Only one such connection 479 is shown, which is similar to local network connection 459.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database or a different database of a standards organization, such as one that can reference EPCs. Remote memory 477 may also contain information associated with commands, tag profiles, secret keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
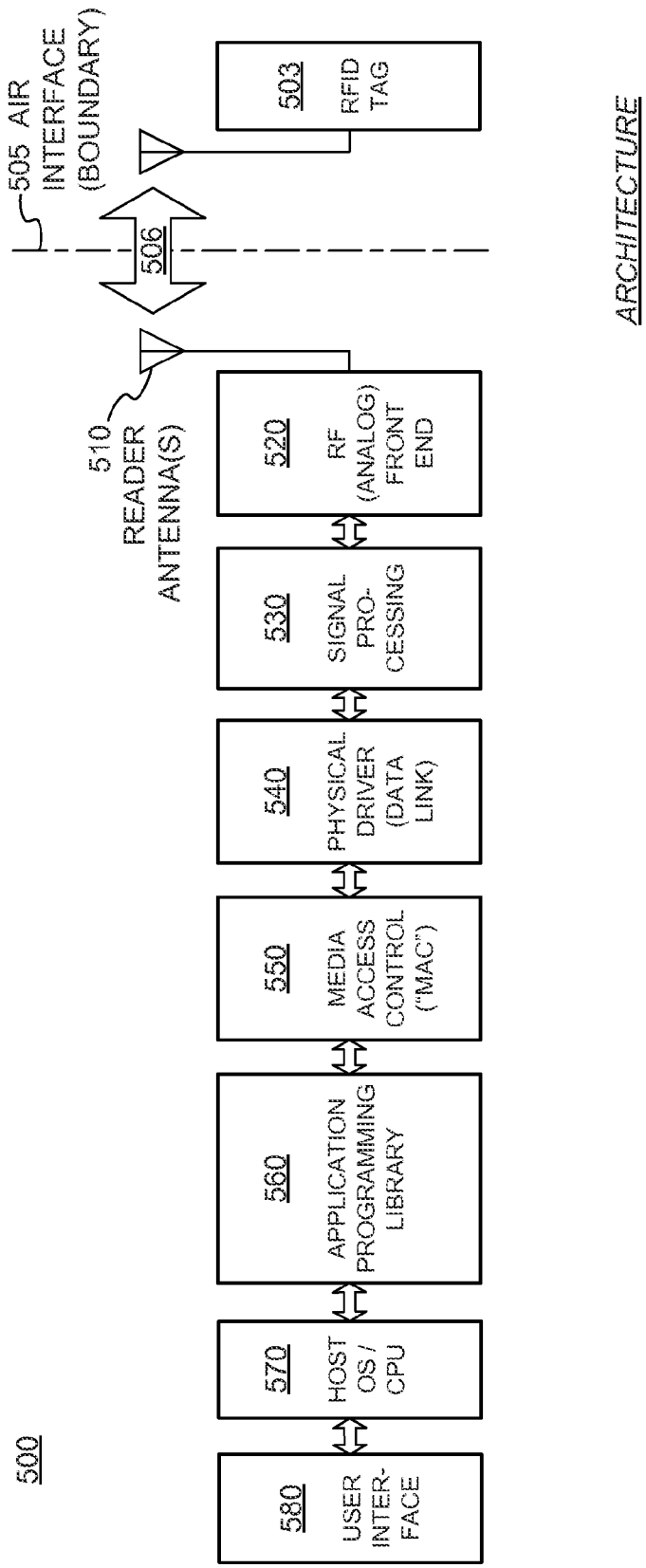
FIG. 5 is a block diagram illustrating an overall architecture of an RFID system according to embodiments.

FIG. 5 is a block diagram illustrating an overall architecture of an RFID system 500 according to embodiments. It will be appreciated that RFID system 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the remainder via air interface 505. It is noteworthy that air interface 505 is really only a boundary, in that signals or data that pass through it are not intended to be transformed from one thing to another. Protocols as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as a data-link module. In some embodiments physical-driver module 540 exchanges data with signal-processing module 530. Physical-driver module 540 can be the stage associated with the framing of data.

RFID system 500 additionally includes a media access control module 550, which is also known as MAC layer module. In one embodiment, MAC layer module 550 exchanges data packets with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving identification data from a tag, challenging the tag, and verifying the tag response through interaction with a verification authority. In some embodiments the one or more processors may verify an electronic signature, create a tag challenge, and verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 510 to be transmitted as wireless waves. In receiving mode, reader antenna(s) 510 receives wireless waves, which are in turn processed successively by the various modules in the chain. Processing can terminate in any one of the modules.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

As mentioned previously, embodiments are directed to a Radio-Frequency Identification (RFID) system authenticating both an RFID tag and a verification authority to determine the legitimacy of the tag, the object to which the tag is attached, and/or the verification authority. Embodiments additionally include programs, and methods of operation of the programs. A program is generally defined as a group of steps or operations leading to a desired result, due to the nature of the elements in the steps and their sequence. A program is often implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If a memory, it can be implemented in a number of ways, such as Read Only Memory (ROM), Random Access Memory (RAM), Flash memory, EPROM memory, EEPROM memory, and many others as will be known to those skilled in the art.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet. Often, for the sake of convenience only, it is desirable to implement and describe a program as software. The software can be unitary, or thought of in terms of various interconnected distinct software modules.

Figure 6:
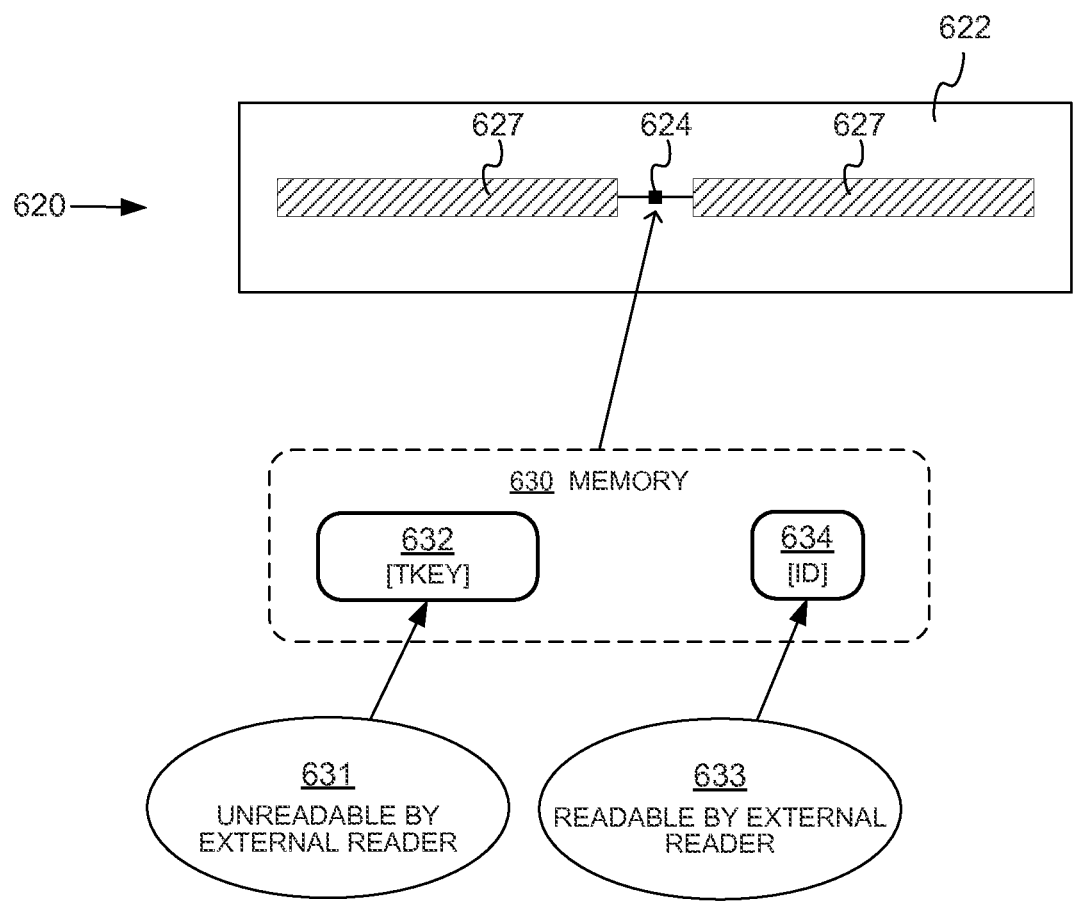
FIG. 6 illustrates an RFID tag configured to store an identifier and a key according to embodiments.

FIG. 6 illustrates a tag 620 configured to store a tag key (TKEY) 632 and an identifier (ID) 634 according to embodiments. Tag 620, similar to tag 220 depicted in FIG. 2, includes an IC 624 (similar to IC 224 in FIG. 2) with a tag memory 630 configured to store the TKEY 632, the ID 634, and any other suitable data. The TKEY 632, which is used to encrypt or decrypt messages sent from or received by the tag 620, is stored in a portion 631 of the tag memory 630 that is not readable by an external device such as a reader. In some embodiments, each individual RFID tag or group of tags may store a distinct tag key.

In contrast, the ID 634, which may identify the tag, an item to which the tag is attached, or both, is stored in a portion 633 of the tag memory 630 that is readable by an external device. For example, the ID 634 may include a tag identifier (TID), a key identifier (KID), a unique item identifier (UII), an electronic product code (EPC), a serialized trade identification number (SGTIN), or any other suitable identifier or identification code.

Figure 7:
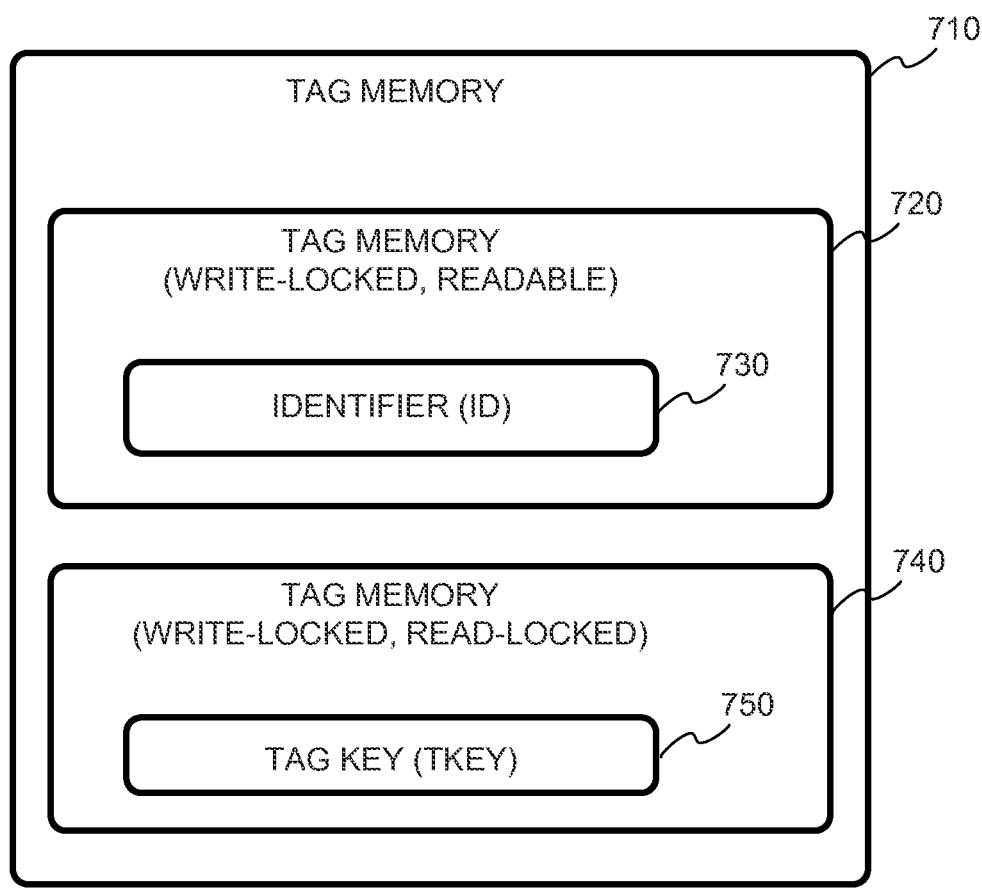
FIG. 7 illustrates a tag memory configuration according to one embodiment.

FIG. 7 depicts a configuration of a tag memory 710 according to one embodiment. Tag memory 710 is similar to tag memory 630 (FIG. 6), and includes at least two tag memory portions 720 and 740. Whereas in some embodiments the tag memory portions 720 and 740 may be portions of a single memory bank or physical memory, in other embodiments the portions 720 and 740 may each comprise separate memory banks, multiple memory banks, or multiple physical memories.

Tag memory portion 720, as with memory portion 633 (FIG. 6), is configured to store ID 730 (similar to ID 634 in FIG. 6) and be readable by an external device such as a reader. Tag memory portion 720 can be further configured to be unwriteable ("write-locked"), such that an external device cannot write to it, thereby preventing damage to or loss of the ID 730.

Similarly, tag memory portion 740 is akin to memory portion 631 (FIG. 6) in that it is configured to store TKEY 750 (similar to TKEY 632 in FIG. 6) and usually is unreadable by an external device. As with tag memory portion 720, tag memory portion 740 can also be configured to be unwriteable, thereby preventing damage to or loss of the TKEY 750. In some embodiments ID 730 and/or TKEY 750 may be encrypted.

At some point in time, ID 730 and TKEY 750 were written into tag memory portions 720 and 740, respectively. For example, a tag manufacturer may generate ID 730 and write it into tag memory portion 720 when the tag was manufactured or soon afterward. Similarly, the tag manufacturer may write the TKEY 750 into tag memory portion 740, either at the same time as ID 730 or at some other time. Alternatively, the tag supplier, verification authority, or even another entity can perform the writing. Although tag memory portions 720 and 740 are shown as unwriteable ("write-locked") in FIG. 7, the tag manufacturer or other entity may write the ID 730/ TKEY 750 before rendering the tag memory portions unwriteable, or may write the data in some other way (e.g., via direct physical access to the memory portions).

In some embodiments, a reader may be able to reconfigure the tag in order to replace the ID 730 and/or TKEY 750 written in tag memory portions 720 and 740 with a different ID or TKEY. For example, the tag memory portions 720/740 may be configured to be unwriteable by readers without proper authorization but writeable by readers having proper authorization. Thus, an authorized reader may be able to write a new ID and/or TKEY into the tag memory portions 720/740.

Figure 8:
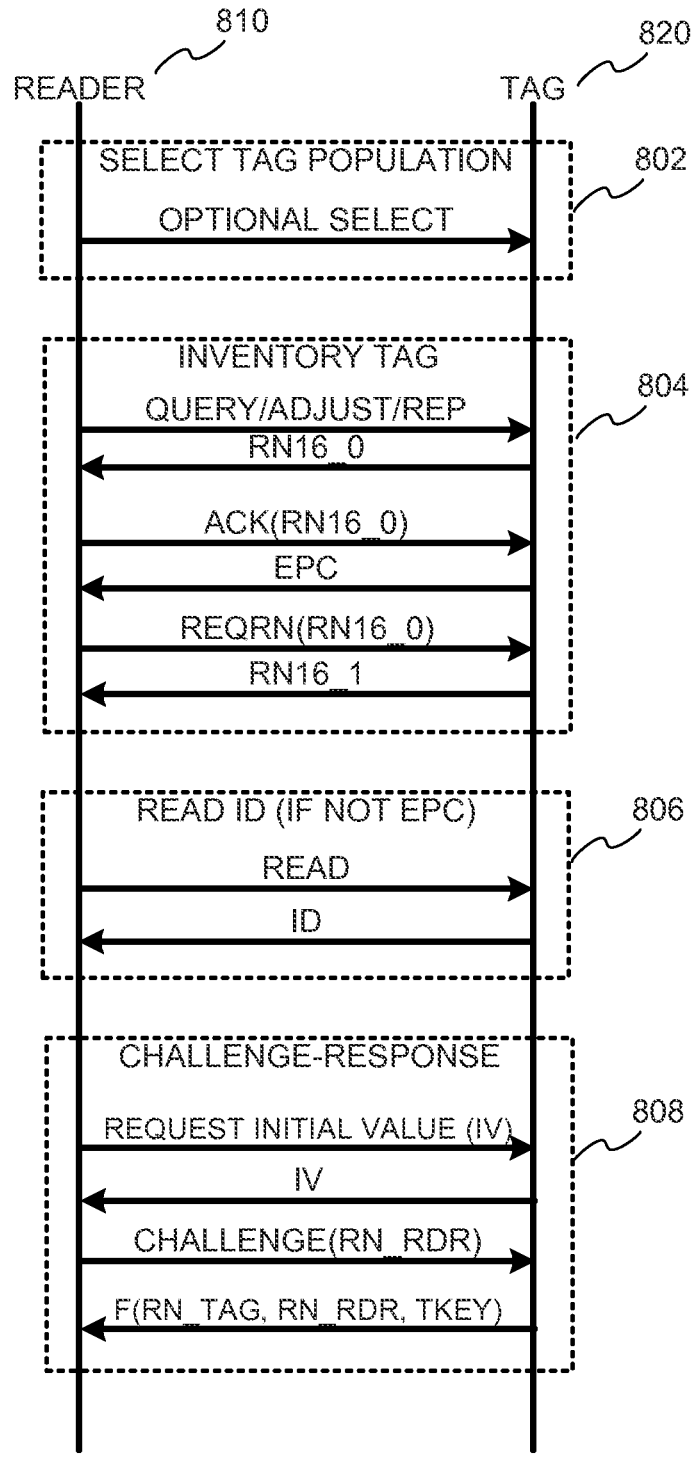
FIG. 8 illustrates a sequence of communications signals between a reader and a tag according to embodiments.

FIG. 8 depicts a sequence 800 of communications signals between a reader 810 and a tag 820 according to one embodiment. The sequence of signals proceeds downward chronologically (i.e., lower signals occur later), with signals from the reader to the tag indicated by arrows pointing right and signals from the tag to the reader indicated by arrows pointing left.

The command and response signals in sequence 800 assume that the reader 810 and tag 820 are using the Gen2 Specification communication protocol. However, any suitable protocol or command sequence may be used. The particular order of the signals in sequence 800 may vary, and signals and reader/tag operations may be performed in different orders, merged, enhanced, eliminated, and/or spread across other signals/operations.

The sequence 800 begins with an optional tag selection 802, where the reader 810 selects one or more tags from a tag population for inventorying and/or authentication. For example, the reader 810 may broadcast a select command to the tag population, and tags in the population that meet one or more criteria in the select command may be selected.

Reader 810 then performs an inventory 804 to singulate an individual tag from the tag population (or from within a group of selected tags, if the reader performed optional tag selection 802). In some embodiments, the reader performs the inventory 804 according to the Query-ACK sequence described in the Gen2 Specification. In the Gen2 Query-ACK sequence, a reader first transmits a Query/QueryAdj/QueryRep command. A tag that meets the criteria for responding may then reply with a 16-bit random/pseudorandom number RN16_0. Upon receipt of the RN16_0, the reader transmits an Acknowledge command with the RN16_0 to the tag, which may then respond with its EPC. The reader then transmits a REQRN command with the RN16_0, which requests a new RN16 from the tag for use as a tag handle. The tag then responds a RN16_1 handle.

After performing the inventory 804, the reader then performs a read 806 in order to access and read the ID (e.g., ID 634/730 in FIGS. 6/7) stored on the tag (if the ID is not the EPC which the tag had previously transmitted in inventory 804). Upon receiving the read command sent by the reader, the tag transmits its stored ID to the reader.

Upon reading the tag ID in read 806, the reader then challenges the tag in a challenge-response step 808. In the challenge-response step 808, the reader may first request an initial value (IV) from the tag. The IV represents tag randomness used to enhance the security of challenge-response step 808. In some embodiments the tag may generate the IV using a tag random number that may have been previously stored in the tag, generated in situ, or generated in situ and then stored in the tag. In some embodiments the tag may generate the IV using its TKEY. In some embodiments the tag may generate the IV by reading an IV that was previously stored in tag memory. After generating the IV, the tag transmits it to the reader. In some embodiments, the tag may encrypt the IV before transmission.

After receiving the optional IV, the reader transmits a challenge to the tag containing a reader random number (which may be encrypted). In some embodiments, the reader generates the challenge based on the reader random number and the IV/tag random number. Using a cryptographic algorithm, the tag then generates and transmits a response back to the reader based on the received reader random number, the tag random number, and the stored TKEY (e.g., TKEY 632/750 in FIGS. 6/7).

As mentioned above, the commands and signals in sequence 800 do not have to be performed in the particular order shown, or even grouped as shown. The commands and signals may be separated, combined, or interspersed among each other. For example, an interrogated tag may transmit its tag ID with its response to a reader challenge, instead of providing its tag ID in inventory 804 or read 806. The tag may transmit its tag ID with its response as consecutive messages, or may concatenate the response with the tag ID, for example by prepending the response with the tag ID, appending the tag ID to the tag response, or otherwise combining the tag ID and the response in the same message. As another example, the reader may send the request for the IV during the optional tag selection 802. Because the select signal in tag selection 802 is broadcast to a population of tags, multiple tags may receive the reader's IV request. In response, each tag that receives the IV request may generate its own IV and then store the IV in tag memory. The reader may then subsequently read each tag (e.g., in read 806) to retrieve the stored IV.

In some embodiments, the reader may broadcast the challenge with the reader random number before the IV request or along with the IV request. Each tag that receives the challenge may generate or compute its own response based on the received reader random number, its stored TKEY, and its generated IV (or the tag random number associated with the IV). At least one of the tags may then store its IV and its computed response in tag memory, and the reader may then subsequently read the tag memory (e.g., in read 806) to retrieve the IV and computed response.

In some embodiments, sequence 800 may not include an explicit challenge-response step 808, because its constituent commands have been interspersed among the other commands in the sequence. A reader may choose to broadcast the IV request and/or the challenge to multiple tags in the optional select 802 in order to allow all of the tags that hear the broadcast to simultaneously generate their IV and compute their responses. In contrast to the challenge-response step 808, where each tag generates its IV and challenge-response serially (i.e., one tag after another), enabling multiple tags to perform these operations in parallel is faster. Due to the time-intensive nature of the cryptographic computations involved in generating IVs or challenge/responses, the time saved by allowing tags to compute in parallel instead of serially can be substantial.

Whereas challenge-response step 808 in sequence 800 includes an IV, in some embodiments step 808 may not use or include an IV. In some embodiments, a tag challenge-response may include a command count (e.g., a count from the reader indicating the number of commands it has transmitted or a count from the tag indicating the number of commands it has received) and/or a message authentication code (e.g., an electronic signature). Other challenge-responses may include more or fewer steps than the particular challenge-response 808 shown in sequence 800.

In some embodiments, the reader may interact with a verification authority that has some knowledge about the interrogated tag(s) (such as the TKEY and/or the encryption algorithm(s) used by the one or more tags). The verification authority may be known to the reader a priori, or the reader may query a network for the identity of an appropriate verification authority. In some embodiments, a tag may store the identity of a verification authority suitable for verification, and the reader may read the verification authority information from the tag.

After the reader has received a tag response in the challenge-response step 808, the reader may send the tag response, the tag IV (if any), the original reader challenge, and the tag ID (received in read 806) to the verification authority. The verification authority may then determine the TKEY and/or the particular encryption algorithm used by that tag (e.g., by looking it up based on the received tag ID) and use the determined TKEY/encryption algorithm, along with the original reader challenge and tag IV (if any), to decrypt or verify the tag response. If the verification authority is able to decrypt/verify the tag response then it may confirm the tag response and thereby corroborates the tag's (or attached item's) authenticity; if the verification authority is unable to decrypt/verify the tag response then may alert the reader and/or a third party that the tag and/or the attached item may be fake.

In some embodiments, the verification authority may generate the challenge and send it to the reader for transmission to the tag. In this case, the reader may not transmit the original reader challenge back to the verification authority along with the tag response, tag IV, and the tag ID, because the verification authority already knows the challenge. Optionally, the verification authority may generate and provide a random number (e.g., the reader random number or an entirely different random number) for the reader to use to generate the challenge.

Figure 9:
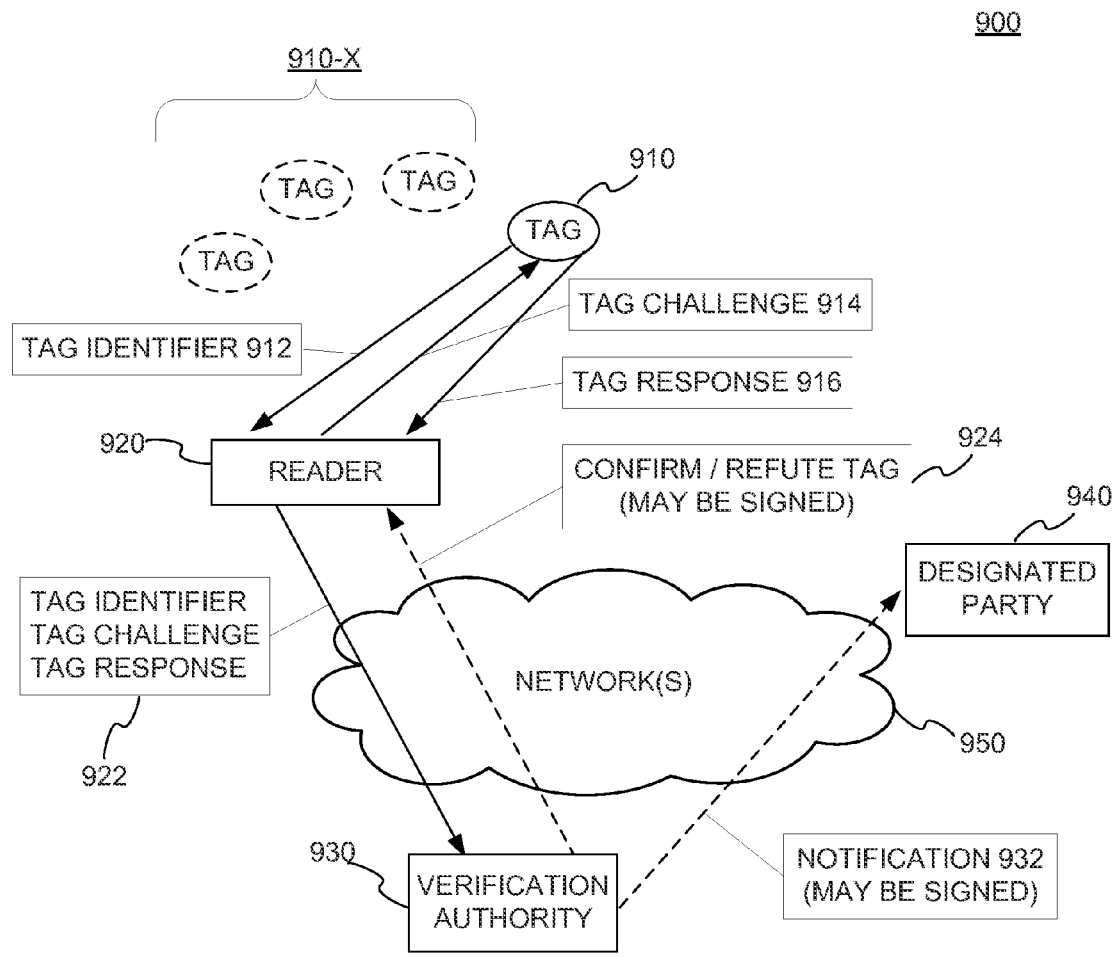
FIG. 9 is a diagram depicting interactions between an RFID reader, RFID tags, a verification authority, and a designated party according to embodiments.

FIG. 9 is a diagram 900 depicting interactions between an RFID reader 920, RFID tags 910-X and 910, a verification authority 930, and a designated party 940 according to one embodiment. In diagram 900, reader 920 is communicating with a number of tags 910-X and 910. Reader 920 has singulated tag 910 and received a tag identifier 912 (an EPC or other identifier such as ID 634/730 in FIGS. 6/7) from tag 910. Reader 920 then transmits a tag challenge 914 (e.g., the challenge in challenge-response step 808, FIG. 8) to tag 910. Tag 910, which stores a secret (such as TKEY 632/750 in FIGS. 6/7), generates a tag response 916 (e.g., the F( ) response in challenge-response step 808, FIG. 8) based on the stored secret, the tag challenge 914, and optionally some tag-generated randomness. Tag 910 then transmits its tag response 916 to the reader 920.

The reader 920 then transmits (922) the tag identifier 912, the tag challenge 914, the tag response 916, and optionally any indicators of tag-generated randomness (e.g., a tag IV) to a verification authority 930 over one or more networks 950. The verification authority 930 stores or has access to information about the tag 910, such as its stored secret and/or the encryption algorithm it uses. Verification authority 930 then uses its information, the received tag identifier 912, tag challenge 914, and tag response 916 to determine if the tag is authentic. For example, in one embodiment the verification authority 930 may use the received tag identifier 912 to find and access a local copy of the tag's stored secret/key, compute a response from the secret/key and the received tag challenge 914, and compare the computed response with the actual, received tag response 916. If the two responses match then the tag is authentic, and if the responses do not match then the tag is not authentic. The verification authority 930 may then optionally send a message 924 to the reader 920 via network(s) 950 confirming or refuting the authenticity of the tag (or an item it is attached to).

In some embodiments, the message 922 transmitted by the reader 920 to the verification authority 930 may include the physical location of the reader when the challenge was issued to the tag 910. The message 922 may also include a reader identifier, and/or may be signed with a reader electronic signature.

The verification authority 930 may transmit a notification 932 to one or more designated parties 940 via network(s) 950 indicating whether the authenticity of tag 910 was confirmed or refuted. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine.

In some embodiments, the verification authority 930 may transmit a message to the reader 920 if the authenticity of the tag 910 is confirmed or refuted. In other embodiments, the verification authority 930 may only transmit a message if tag authenticity is confirmed, if it is refuted, or may not transmit a message to the reader 920 at all. The verification authority 930 may also transmit a notification to a designated party or parties 940 if the authenticity of the tag 910 is confirmed or refuted, only if tag authenticity is confirmed, or only if tag authenticity is refuted.

In some embodiments message 924 and notification 932 may be electronically signed by the verification authority 930. For example, the verification authority may compute an electronic signature based on the message/notification to be transmitted, a key or secret associated with the verification authority, and a cryptographic algorithm, and attach the computed electronic signature to the message/notification. When an entity (e.g., reader 920 or designated party 940) receives the message/notification, it may use the electronic signature to validate the message/notification by determining (a) if the message/notification actually came from the verification authority, and (b) if the message/notification was altered during transmission from the verification authority. In one embodiment, the receiving entity may perform these determinations using a public key (related to the private key/secret used by the verification authority to compute the electronic signature).

Figure 10:
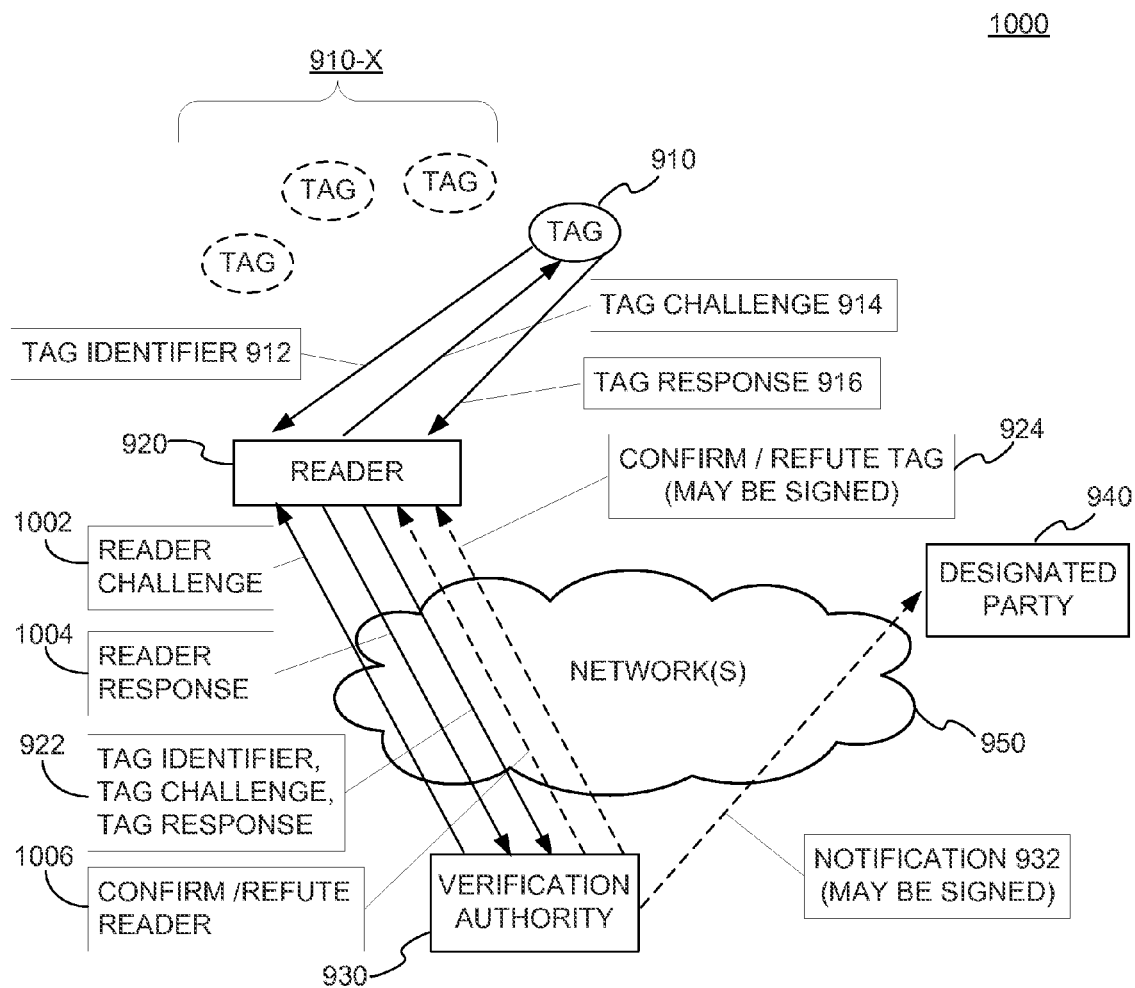
FIG. 10 is another diagram depicting interactions between an RFID reader, RFID tags, a verification authority, and a designated party according to embodiments.

FIG. 10 is a diagram 1000 depicting interactions between an RFID reader, RFID tags, a verification authority, and a designated party according to embodiments. Diagram 1000 is similar to diagram 900, with similarly-numbered elements behaving similarly. Diagram 1000 also includes interactions for reader authentication. As mentioned above, in some embodiments the verification authority 930 may need to authenticate the reader itself. In these embodiments, the verification authority 930 transmits a reader challenge 1002 to the reader 920, either before the verification authority 930 receives message 922 or in response to receiving message 922. In response, the reader 920 generates a reader response 1004, similar to how tag 910 generates tag response 916 (i.e., by using a stored reader secret, the reader challenge, and optionally reader-generated randomness). The reader 920 then transmits the reader response 1004 to the verification authority 930, either before transmitting message 922, after transmitting message 922, or along with (or embedded in) message 922. In some embodiments, the reader 920 also transmits the physical location of the reader when the challenge was issued to the tag 910 and/or a reader identifier (not shown) to the verification authority 930. In some embodiments, the reader 920 may sign its transmitted messages with a reader electronic signature, which may help further indicate that the reader is legitimate/authentic.

In embodiments where the reader 920 needs to be authenticated, the verification authority 930 may wait to perform authentication on the received message 922 until the reader 920 has been authenticated. The verification authority 930 may authenticate the reader 920 in the same way it authenticates received message 922. For example, the verification authority 930 may store or have access to information about the reader 920 such as its secret and/or the cryptographic algorithm it uses, and may use this information, the reader challenge 1002, and the reader response 1004 to determine whether the reader 920 is authentic (e.g., by computing a response and comparing it to the reader response 1004).

After the verification authority 930 has determined the authenticity of the reader 920, it may transmit a reader confirmation/refutation message 1006 to the reader 920. If the reader 920 has also transmitted a message 922 requesting authentication of tag 910, the verification authority 930 may perform the tag authentication as described above and transmit a tag confirmation/refutation message 924 to the reader 920. In some embodiments, instead of transmitting reader confirmation/refutation message 1006, the verification authority 930 may use the tag confirmation/refutation message 924 as a proxy. For example, if the reader 920 is confirmed to be authentic, the verification authority 930 may send the tag confirmation/refutation message 924. If, on the other hand, the reader 920 is not determined to be authentic, the verification authority 930 may not send the tag confirmation/refutation message 924 in response to message 924. The verification authority 930 may even transmit a false tag confirmation/refutation message 924 if the reader 920 is determined to not be authentic, and then optionally alert a third party of the not-authentic reader.

In some embodiments, if the verification authority 930 transmits a reader confirmation/refutation message 1006 to the reader 920, the verification authority 930 may transmit a tag confirmation/refutation message if tag authenticity is confirmed, if it is refuted, or may not transmit a tag confirmation/refutation message to the reader 920 at all.

In diagrams 900 and 1000, the verification authority 930 may transmit a notification 932 to one or more designated parties 940 via network(s) 950 indicating whether the authenticity of reader 920 and/or tag 910 was confirmed or refuted. As described in the example above, a pharmaceutical distributor using an RFID-enabled reader to interrogate a case of medicine may use a verification authority, which may send the reply to a designated party such as the distributor's security office or, in some instances, directly to the police in the event of counterfeit medicine. The verification authority 930 may transmit a notification to a designated party or parties 940 if the authenticity of the tag 910/reader 920 is confirmed or refuted, only if tag/reader authenticity is confirmed, or only if tag/reader authenticity is refuted.

As shown in diagrams 900 and 1000, the verification authority 930 communicates with the reader 920 and the designated party 940 over one or more networks 950. The network(s) 950 may be available in real-time, meaning that an entity can engage with another entity on the network 950 on a message-by-message basis, or the network(s) 950 may be non-real-time, meaning that an entity stores or buffers its messages and later transmits them to other entities when the network is available. Of course, entities may also store and later transmit messages to other entities on a network that is available in real-time.

In some embodiments, the reader 920 may store responses from multiple tags before transmitting one or more of the responses to the verification authority 930. In this embodiment, the reader 920 may configure its transmissions to the verification authority 930 to take advantage of batch transmission. If the reader 920 stores responses from multiple tags to a single challenge, the reader 920 may first transmit a subset (one or more) of the stored responses but only one copy of the challenge to the verification authority 930. Subsequently, the reader 920 may transmit more of the stored responses, but no further challenges, to the verification authority 930.

Figure 11:
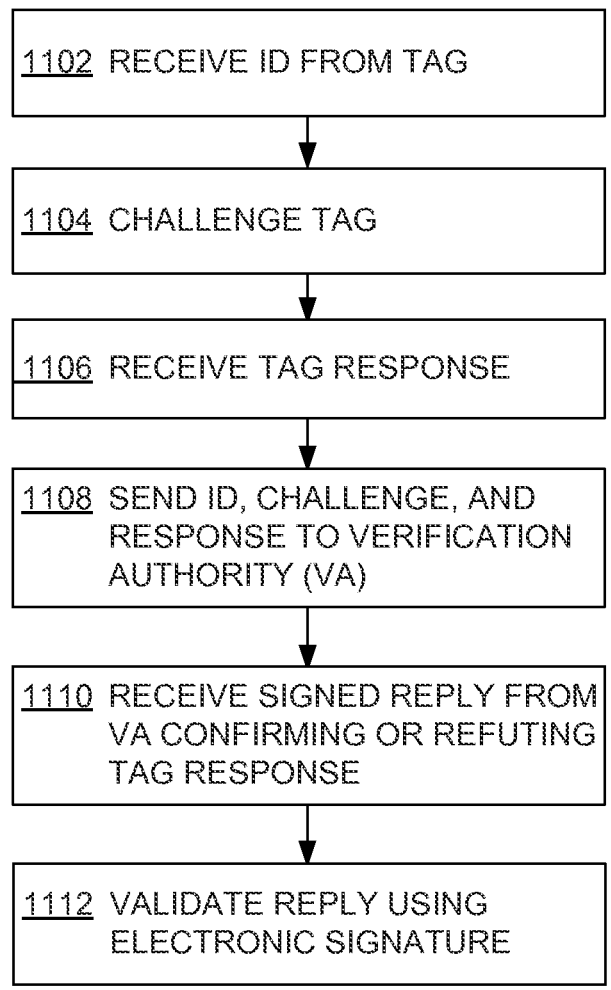
FIG. 11 is a flowchart illustrating a process for a reader authenticating a tag according to embodiments.

FIG. 11 is a flowchart illustrating a process 1100 for tag authentication according to embodiments. In step 1102, a reader (e.g., reader 920 in FIG. 9) receives an identifier ID (e.g., ID 634/730 in FIGS. 6/7) from a tag (e.g., tag 910 in FIG. 9). The reader then challenges the tag at step 1104 by transmitting a challenge to the tag (e.g., as part of the challenge-response step 808 in FIG. 8). In step 1106, the reader receives a response from the tag. The reader then sends the ID, challenge, and response to a verification authority (e.g., verification authority 930 in FIG. 9) in step 1108. In step 1110, the reader receives an electronically-signed reply from the verification authority confirming or refuting the tag response. Finally, in step 1112, the reader validates the reply received from the verification authority by checking the reply's electronic signature, as described above in relation to FIG. 9.

Figure 12:
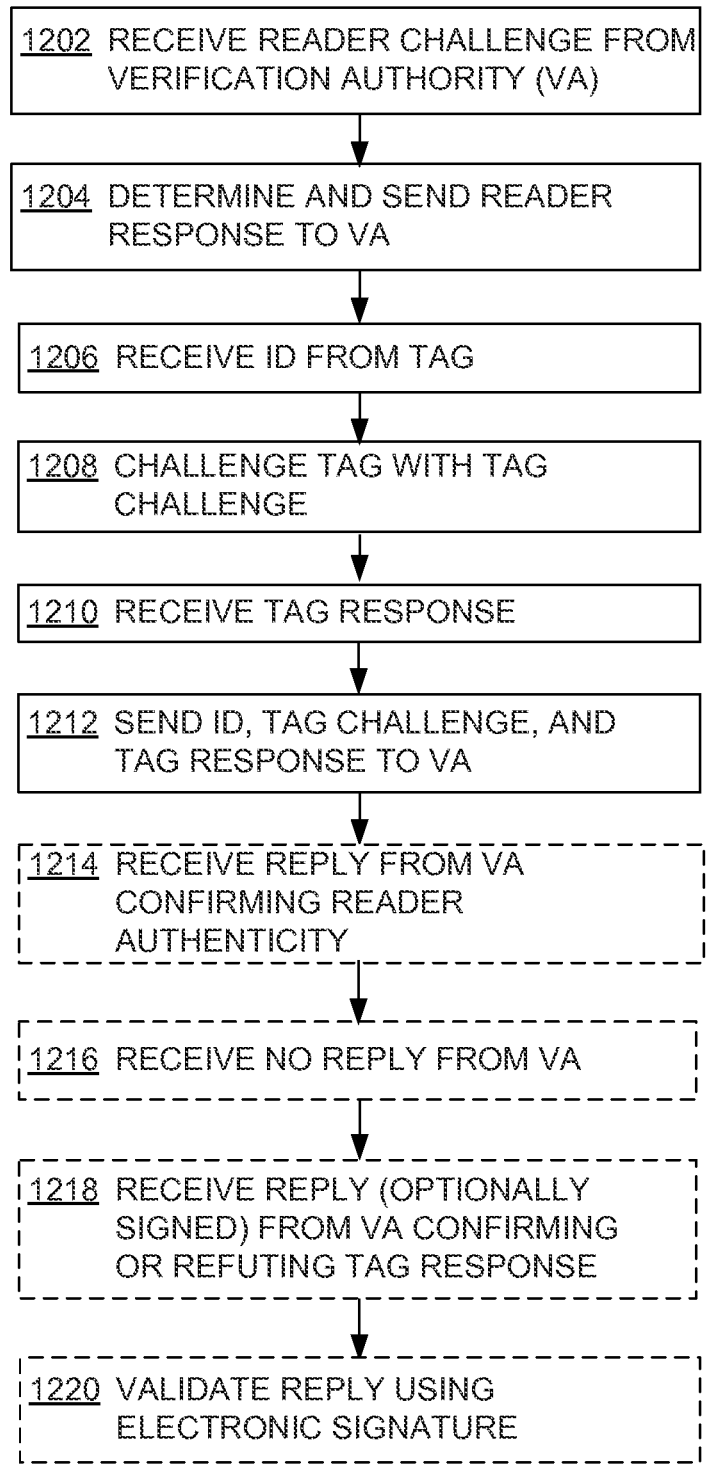
FIG. 12 is a flowchart illustrating a process for reader and tag authentication according to embodiments.

FIG. 12 is a flowchart illustrating a process 1200 for tag authentication according to embodiments. In step 1202, a reader (e.g., reader 920 in FIG. 10) receives a reader challenge (e.g., reader challenge 1002 in FIG. 10) from a verification authority (e.g., verification authority 930 in FIG. 10). In step 1204, the reader determines a reader response (e.g., reader response 1004 in FIG. 10) and transmits it to the verification authority. In step 1206, the reader receives an identifier ID (e.g., ID 634/730 in FIGS. 6/7) from a tag (e.g., tag 910 in FIG. 10). The reader then challenges the tag at step 1208 by transmitting a tag challenge (e.g., as part of the challenge-response step 808 in FIG. 8). In step 1210, the reader receives a response from the tag. The reader then sends the tag ID, tag challenge, and tag response to the verification authority in step 1212. The reader may optionally receive a reply from the verification authority in step 1214 confirming reader authenticity, or may optionally not receive a reply from the verification authority confirming reader authenticity (step 1216). In step 1218 the reader may receive an electronically-signed reply from the verification authority confirming or refuting the tag response (note that, as described above, the VA may or may not send the reply if the reader is not authentic). Finally, in optional step 1220, the reader may validate the reply received from the verification authority by checking the reply's electronic signature, as described above in relation to FIG. 10.

The steps described in processes 1100 and 1200 are for illustrative purposes only. RFID tag and reader authentication by a verification authority may be implemented using additional or fewer steps and in different orders using the principles described herein.

Figure 13:
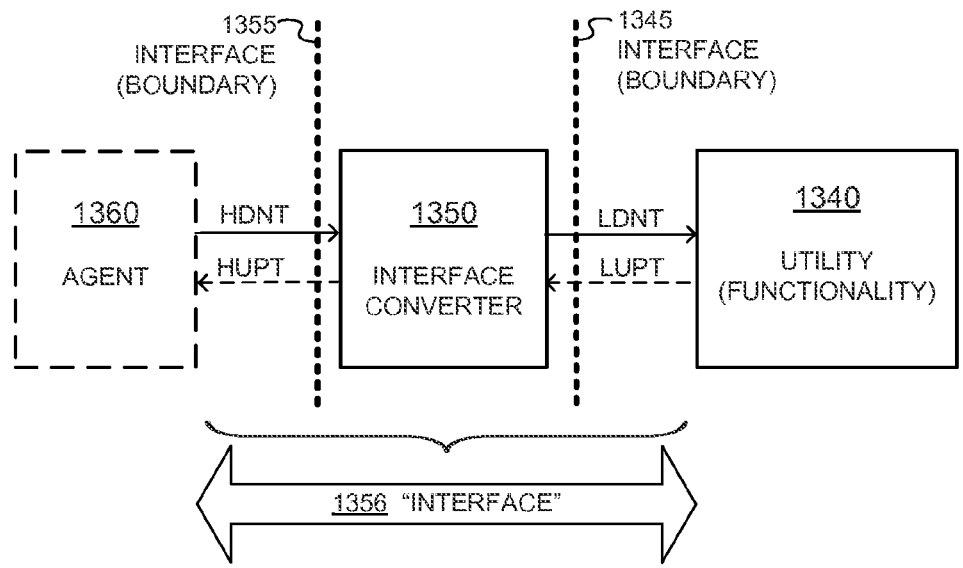
FIG. 13 is a block diagram illustrating an interface-converter architecture according to embodiments.

FIG. 13 is a block diagram illustrating an architecture 1300 for an interface converter according to embodiments. Architecture 1300 includes a utility 1340, which is a mechanism for performing some or all of the reader features described above.

More particularly, utility 1340 may cause a tag to respond to a reader command providing its stored secret or key and also respond to a reader challenge with a challenge response, which is used by the reader to authenticate the tag by sending a message including an identifier, a challenge, and a response from the tag to a verification authority; receiving a reply from the verification authority including an electronic signature; and validating the reply using the electronic signature from the verification authority.

Architecture 1300 additionally includes an interface converter 1350 and an agent 1360. Embodiments also include methods of operation of interface converter 1350. Interface converter 1350 enables agent 1360 to control utility 1340. Interface converter 1350 is so named because it performs a conversion or a change, as will be described in more detail below. Agent 1360, interface converter 1350, and utility 1340 can be implemented in any way known in the art. For example, each can be implemented in hardware, middleware, firmware, software, or any combination thereof. In some embodiments, agent 1360 is a human.

Between interface converter 1350, agent 1360 and utility 1340 there are respective boundaries 1345 and 1355. Boundaries 1345 and 1355 are properly called interfaces, in that they are pure boundaries, as is the air interface described above in relation to FIG. 5.

In addition, it is a sometimes informal usage to call the space between boundaries 1345 and 1355, which includes interface converter 1350, an "interface" 1356. Further, it is common to designate this space with a double arrow as shown, with an understanding that operations take place within the arrow. So, although "interface" 1356 is located at a boundary between agent 1360 and utility 1340, it is not itself a pure boundary. Regardless, the usage of "interface" 1356 is so common for interface converter 1350 that this document sometimes also refers to it as an interface. It is clear that embodiments of such an "interface" 1356 can be included in this invention, if they include an interface converter that converts or alters one type of transmission or data to another, as will be seen below.

Agent 1360 can be one or more architecture layers. For example, agent 1360 can be something which a programmer may program. In alternative embodiments, where agent 1360 is a human, interface converter 1350 can include a screen, a keyboard, etc. An example is now described.

Figure 14:
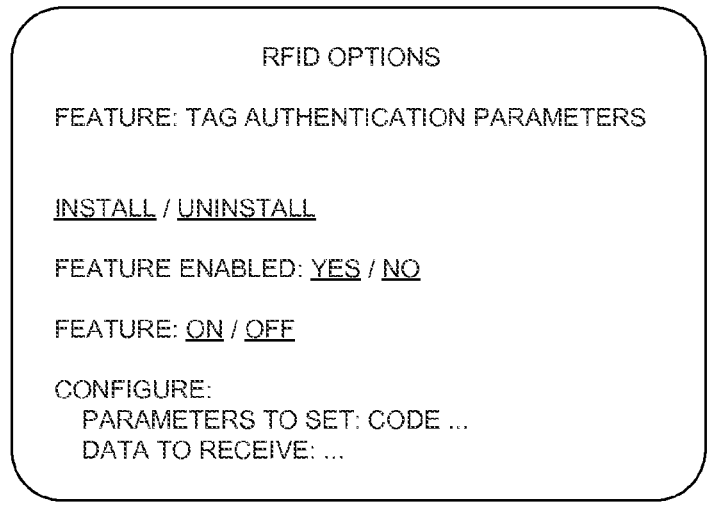
FIG. 14 is a sample screenshot of an interface converter such as the interface converter of FIG. 13, according to an embodiment.

FIG. 14 is a sample screenshot 1450 of an interface converter, such as the interface converter of FIG. 13. Screenshot 1450 can be that of a computer screen for a human agent, according to an embodiment. What is displayed in screenshot 1450 exposes the functionality of a utility, such as utility 1340. Inputs by the user via a keyboard, a mouse, or any suitable user input device can ultimately control utility 1340. Accordingly, such inputs are received in the context of screenshot 1450. These inputs are determined from what is needed for controlling and operating utility 1340. An advantage with such interfacing is that agent 1360 can interact with RFID applications at a higher level, without needing to know how to control lower level RFID operations. Such lower level RFID operations can be as described in the Gen2 Specification, in cryptographic algorithms, in other lower level protocols, etc. Utility 1340 can be controlled in any number of ways, some of which are now described.

Returning to FIG. 13, one way interface converter 1350 can be implemented is as a software Application Programming Interface (API). This API may control or provide inputs to an underlying software library.

Communications can be made between agent 1360, interface converter 1350, and utility 1340. Such communications can be as input or can be converted, using appropriate protocols, etc. These communications may encode commands, data, or any other suitable signal(s). In some embodiments, these communications can include one or more of the following: a high-down communication HDNT from agent 1360 to interface converter 1350; a low-down communication LDNT from interface converter 1350 to utility 1340; a low-up communication LUPT from utility 1340 to interface converter 1350; and a high-up communication HUPT from interface converter 1350 to agent 1360. These communications can be spontaneous, or in response to another communication, in response to an input or an interrupt, or in response to any suitable signal or condition.

In certain embodiments, communications HDNT and LDNT include commands for ultimately controlling utility 1340. These commands may control utility 1340 in any number of ways. For example, one or more commands may install utility 1340 or just a feature of it. The installation may be performed by spawning, downloading, or any other suitable installation method. Other ways in which commands may be used to control utility 1340 include configuring, enabling, disabling, or operating utility 1340, or just a feature of it. These commands can be standalone, or can carry parameters, such as data, instructions to be stored by tags, etc. In some embodiments interface converter 1350 can convert these commands to a format suitable for utility 1340.

In some embodiments, communications HUPT and LUPT include data. The data may indicate the success or failure of executing an operation. The data can also include tag data, which can be both codes read from tags and data about reading tags (such as time stamps, date stamps, RSSI, IVs, responses, etc.). In some embodiments interface converter 1350 can convert the data to a format suitable for agent 1360, including in some cases aggregating, filtering, merging, or otherwise altering the format or utility of the data.

It should be noted that what passes across a single pure boundary is unchanged (by the mere definition of a pure boundary). However, signals or communications passing through interface converter 1350 may be changed. More particularly, high-down communication HDNT may have encoding similar to or different from low-down communication LDNT. In addition, low-up communication LUPT may have encoding similar to or different from high-up communication HUPT. If encoding between signals/communications is different, the difference can be attributed to interface converter 1350, which performs a suitable change, or conversion, of one communication to another. The interface converter 1350 may perform changes or conversions in order to expose the functionality of utility 1340 to agent 1360 and vice versa. In some embodiments, a command is converted, but a parameter is passed along without being converted. What is not converted at one module may be converted at another. Such modules taken together can also form an interface converter according to embodiments.

Figure 15:
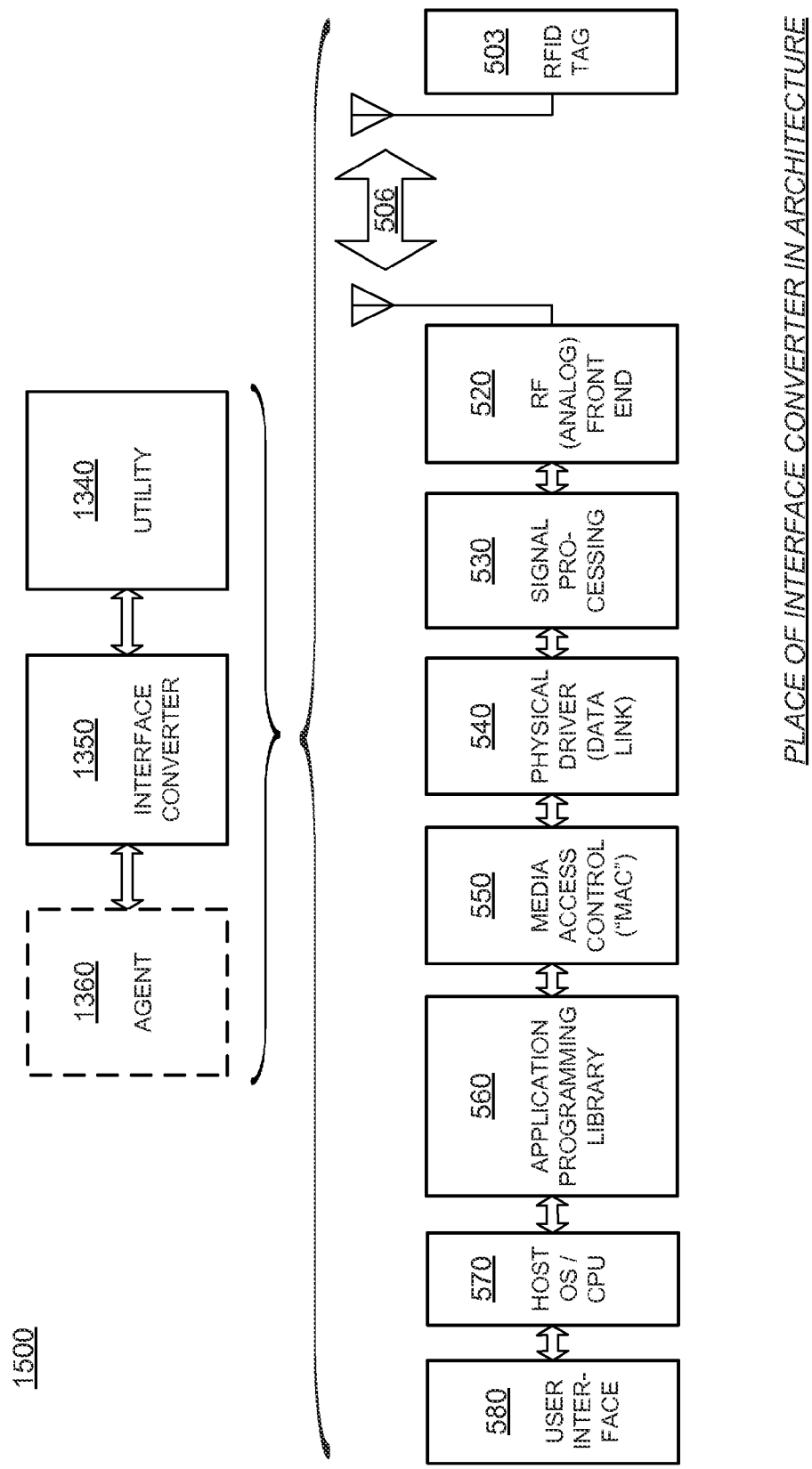
FIG. 15 is a diagram for showing a correspondence for how components of FIG. 14 can be implemented by those of FIG. 5, in embodiments where the interface converter is implemented by a reader.

Agent 1360, interface converter 1350, and utility 1340 can be implemented as part of a reader, or as a different device. In embodiments where the agent 1360, interface converter 1350, and utility 1340 are implemented as part of a reader, FIG. 15 suggests a scheme 1500 where agent 1360, interface converter 1350, and utility 1340 can be implemented in connection with respective reader modules that are suitable, depending on the requirements.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A Radio Frequency Identification (RFID) reader comprising:
   a memory storing a reader key; and
   a processor block configured to:
      receive a reader challenge from a verification authority;
      determine a reader response based at least on the reader challenge and the stored reader key;
      send a first message including at least the reader response to the verification authority;
      receive a first tag identifier from a first tag containing a tag key;
      challenge the first tag with a tag challenge;
      receive a first tag response based at least on the tag challenge and the tag key;
      store the first tag response; and
      store a second tag response from a second tag before sending a second message including at least the first tag identifier and the first tag response to the verification authority.

2. The reader of claim 1, wherein the first message and the second message are combined into a single message.

3. The reader of claim 1, wherein at least one of:
   the first message includes a reader identifier;
   the first message includes a physical location for the reader at a time of receiving the reader challenge; and
   the processor block is configured to sign the first message with an electronic signature.

4. The reader of claim 1, wherein the processor block is further configured to generate a random number and compute the reader response from at least the random number, the reader challenge, and the reader key using a cryptographic algorithm.

5. The reader of claim 1, wherein the processor block is further configured to at least one of:
   receive the tag challenge from the verification authority; and
   send the tag challenge to the verification authority.

6. The reader of claim 1, wherein the verification authority sends a notification to a designated party if at least one of:
   the reader is determined to be not authentic; and
   the tag is determined to be not authentic.

7. A Radio Frequency Identification (RFID) reader comprising:
   a memory storing a reader key; and
   a processor block configured to:
      receive a reader challenge from a verification authority;
      determine a reader response based at least on the reader challenge and the stored reader key;
      send a first message including at least the reader response to the verification authority;
      simultaneously challenge a plurality of tags with a tag challenge;
      receive, from a first tag containing a first tag key, a first tag identifier and a first tag response, the first tag response based at least on the tag challenge and the first tag key;
      receive, from a second tag containing a second tag key, a second tag response based at least on the tag challenge and the second tag key; and
      send a second message including at least the first tag identifier and the first tag response to the verification authority.

8. The reader of claim 7, wherein the first message and the second message are combined into a single message.

9. The reader of claim 7, wherein at least one of:
   the first message includes a reader identifier;
   the first messages includes a physical location for the reader at a time of receiving the reader challenge; and
   the processor blocks is further configured to sign the first message with an electronic signature.

10. The reader of claim 7, wherein the processor block is further configured to generate a random number and compute the reader response from at least the random number, the reader challenge, and the reader key using a cryptographic algorithm.

11. The reader of claim 7, wherein the processor block is further configured to at least one of:
    receive the tag challenge from the verification authority; and
    send the tag challenge to the verification authority.

12. The reader of claim 7, wherein the verification authority sends a notification to a designated party if at least one of:
    the reader is determined to be not authentic; and
    the tag is determined to be not authentic.

13. A Radio Frequency Identification (RFID) reader system comprising:
    a reader containing a reader key and configured to:
       receive a reader challenge from a verification authority;
       determine a reader response based at least on the reader challenge and the reader key;
       send a first message including at least the reader response but not the reader key to the verification authority;
       receive a tag identifier from a tag containing a tag key;
       challenge the tag with a tag challenge;
       receive a tag response based at least on the tag challenge and the tag key but not including the tag key; and
       send a second message including at least the tag identifier and the tag response to the verification authority; and
    the verification authority configured to send a notification to a designated party if at least one of the reader is determined to be not authentic and the tag is determined to be not authentic.

14. The system of claim 13, wherein the first message and the second message are combined into a single message.

15. The system of claim 13, wherein the reader is further configured to store a plurality of tag responses from a plurality of tags before sending at least one of the plurality of tag responses to the verification authority.

16. The system of claim 13, wherein the reader is further configured to:
    challenge a plurality of tags with one tag challenge simultaneously; and
    subsequently receive a tag response stored in at least one tag in the plurality of tags.

17. The system of claim 13, wherein at least one of:
    the first message includes a reader identifier;
    the first message includes a physical location for the reader at a time of receiving the reader challenge; and
    the reader is further configured to sign the first message with an electronic signature.

18. The system of claim 13, wherein the reader is further configured to generate a random number and compute the reader response from at least the random number, the reader challenge, and the reader key using a cryptographic algorithm.

19. The system of claim 13, wherein the reader is further configured to at least one of:
  receive the tag challenge from the verification authority; and
  send the tag challenge to the verification authority.

20. The system of claim 13, wherein the verification authority is further configured to electronically sign at least one of the notification and a reply to the reader.

* * * * *